(No Model.) 5 Sheets—Sheet 1.

W. B. TURNER.
CLUTCH MECHANISM.

No. 387,272. Patented Aug. 7, 1888.

(No Model.) 5 Sheets—Sheet 2.

W. B. TURNER.
CLUTCH MECHANISM.

No. 387,272. Patented Aug. 7, 1888.

(No Model.) 5 Sheets—Sheet 3.

W. B. TURNER.
CLUTCH MECHANISM.

No. 387,272. Patented Aug. 7, 1888.

(No Model.) 5 Sheets—Sheet 4.

W. B. TURNER.
CLUTCH MECHANISM.

No. 387,272. Patented Aug. 7, 1888.

Attest:
G. H. Botts
G. M. Borst

Inventor:
William B. Turner
by Philipp, Philipp & Hovey
Attys.

(No Model.) 5 Sheets—Sheet 5.
W. B. TURNER.
CLUTCH MECHANISM.
No. 387,272. Patented Aug. 7, 1888.
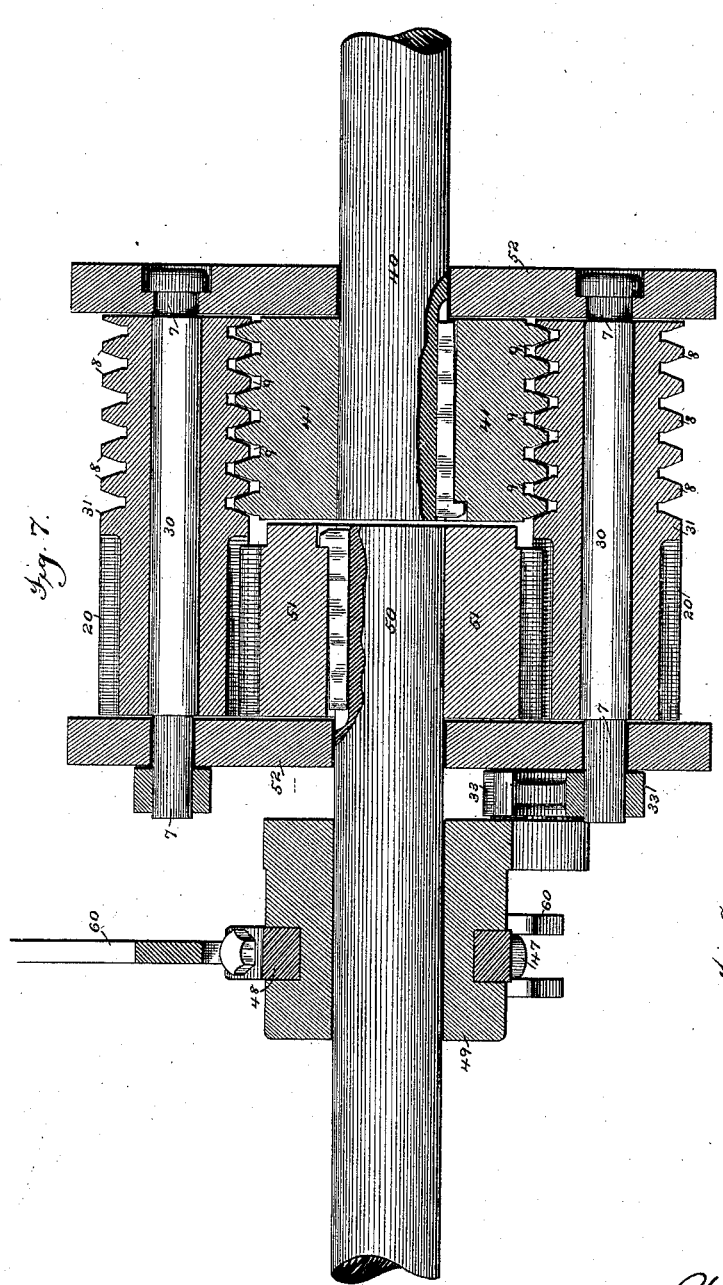

UNITED STATES PATENT OFFICE.

WILLIAM B. TURNER, OF NEW YORK, N. Y.

CLUTCH MECHANISM.

SPECIFICATION forming part of Letters Patent No. 387,272, dated August 7, 1888.

Application filed March 24, 1888. Serial No. 268,381. (No model.)

*To all whom it may concern:*

Be it known that I, WILLIAM B. TURNER, a citizen of the United States, residing at New York, county of New York, and State of New York, have invented certain new and useful Improvements in Clutch Mechanism, fully described and represented in the following specification and the accompanying drawings, forming a part of the same.

This invention relates to a clutch mechanism which is especially designed and adapted for use in transmitting motion from one to the other of two shafts which are arranged end to end or in line with each other, or from a gear or pulley to a shaft, or vice versa, it being the object of the invention to provide a mechanism for this purpose which can be readily operated from a distance, and by which the coupling and uncoupling can be effected without any sudden jar or strain upon the parts.

As a full understanding of the invention can only be imparted by a detailed description of a clutch mechanism embodying the same, all preliminary description of the invention will be omitted and a full description given, reference being had to the accompanying drawings, in which—

Figure 1:
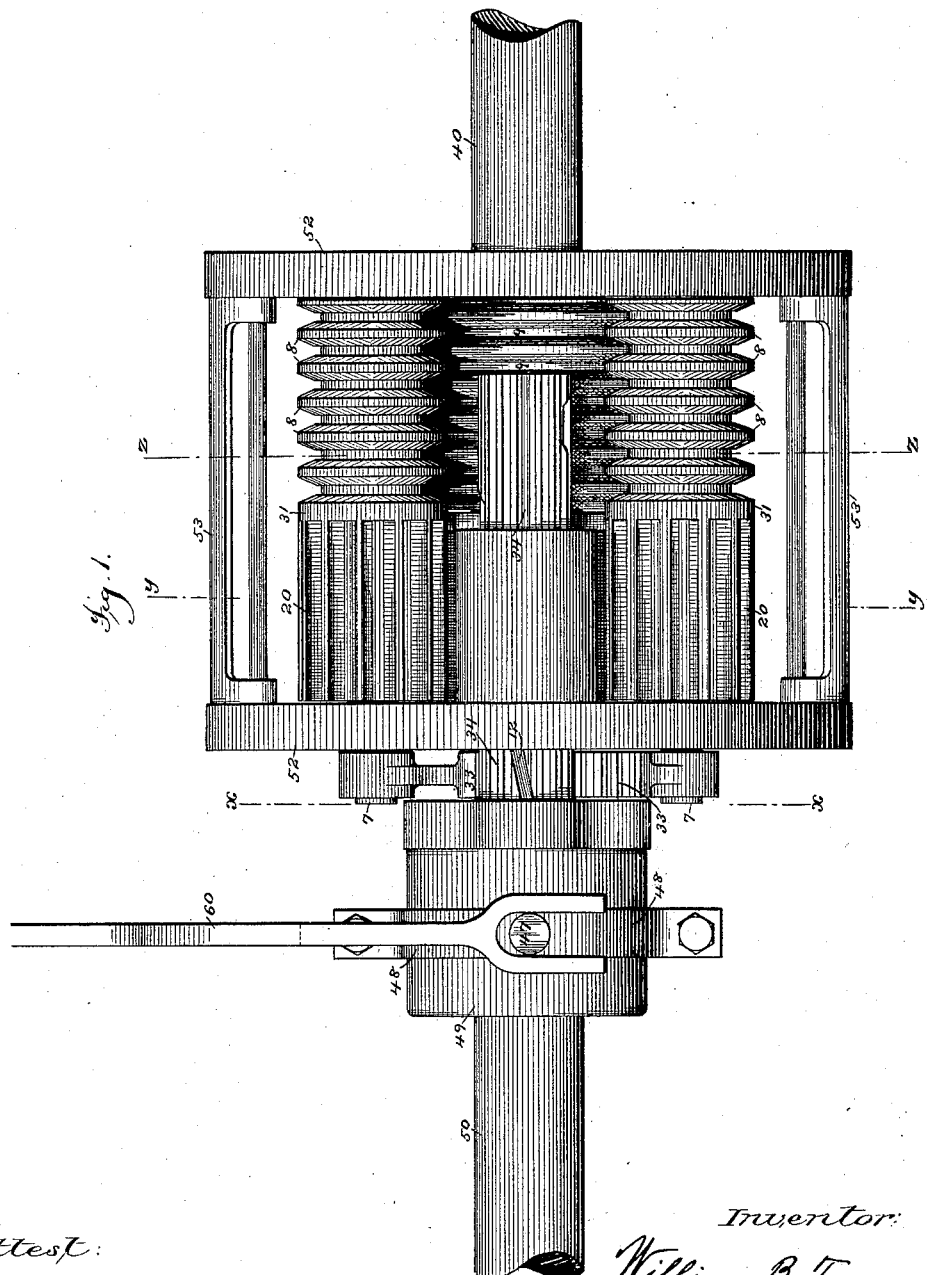
Figure 2:
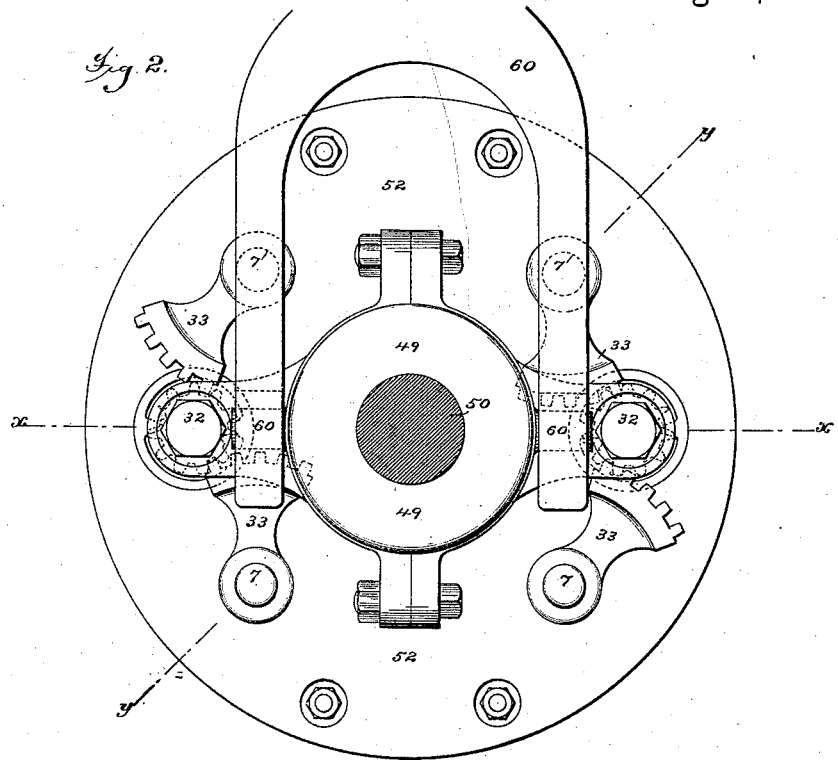
Figure 3:
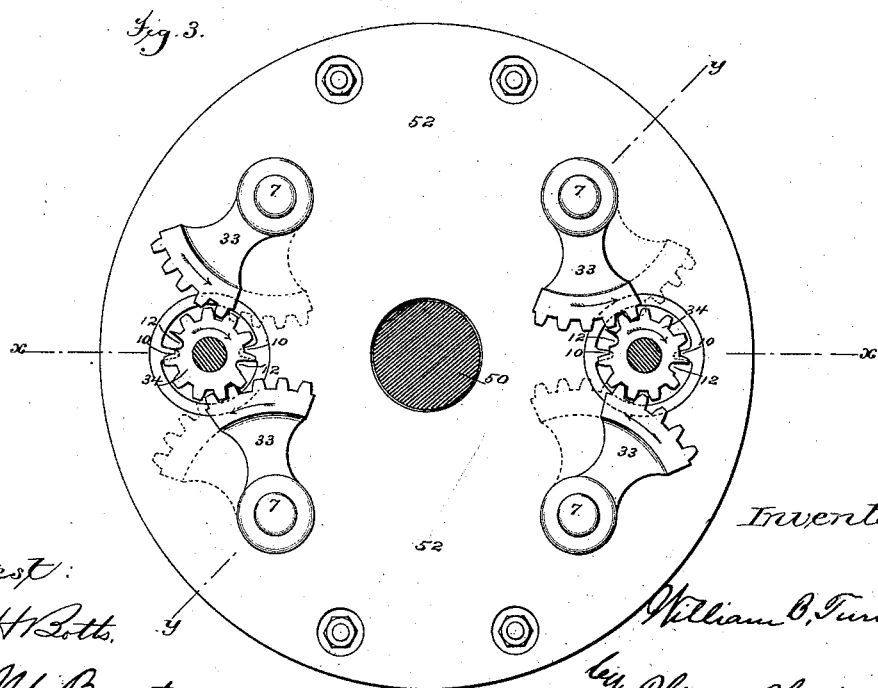
Figure 4:
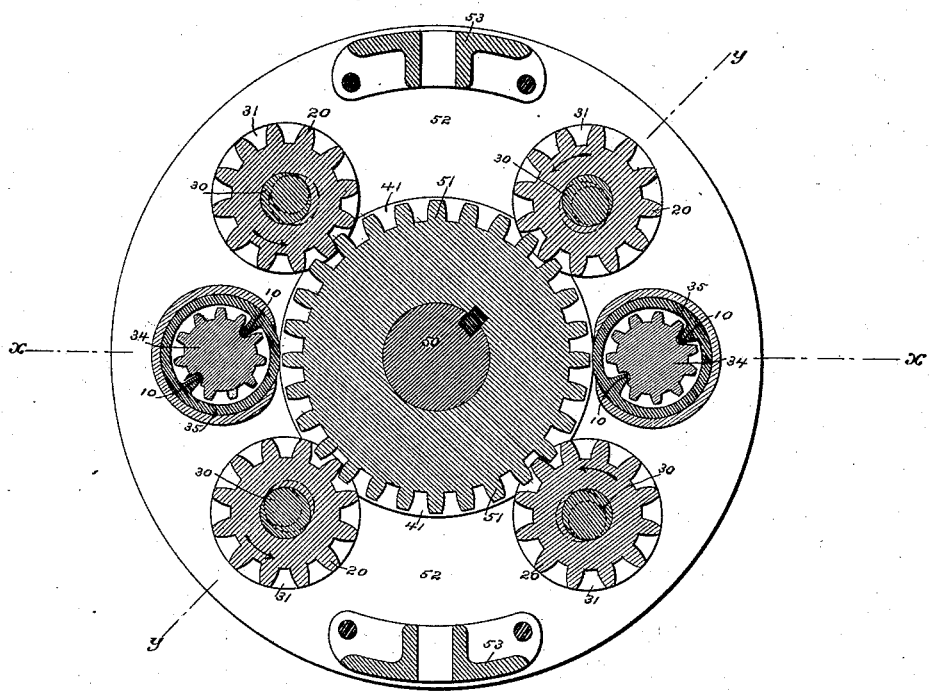
Figure 5:
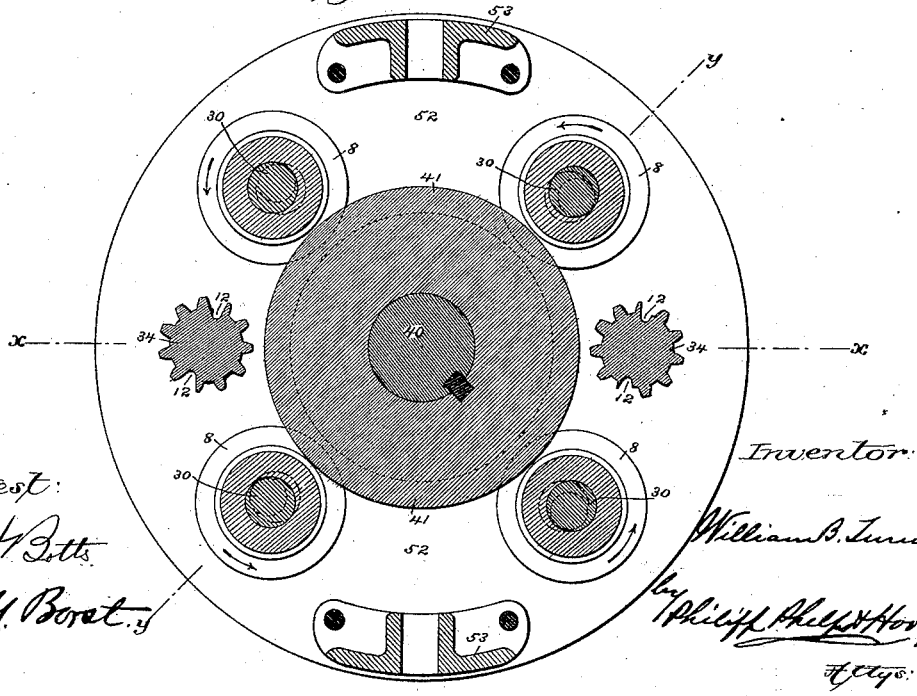
Figure 6:
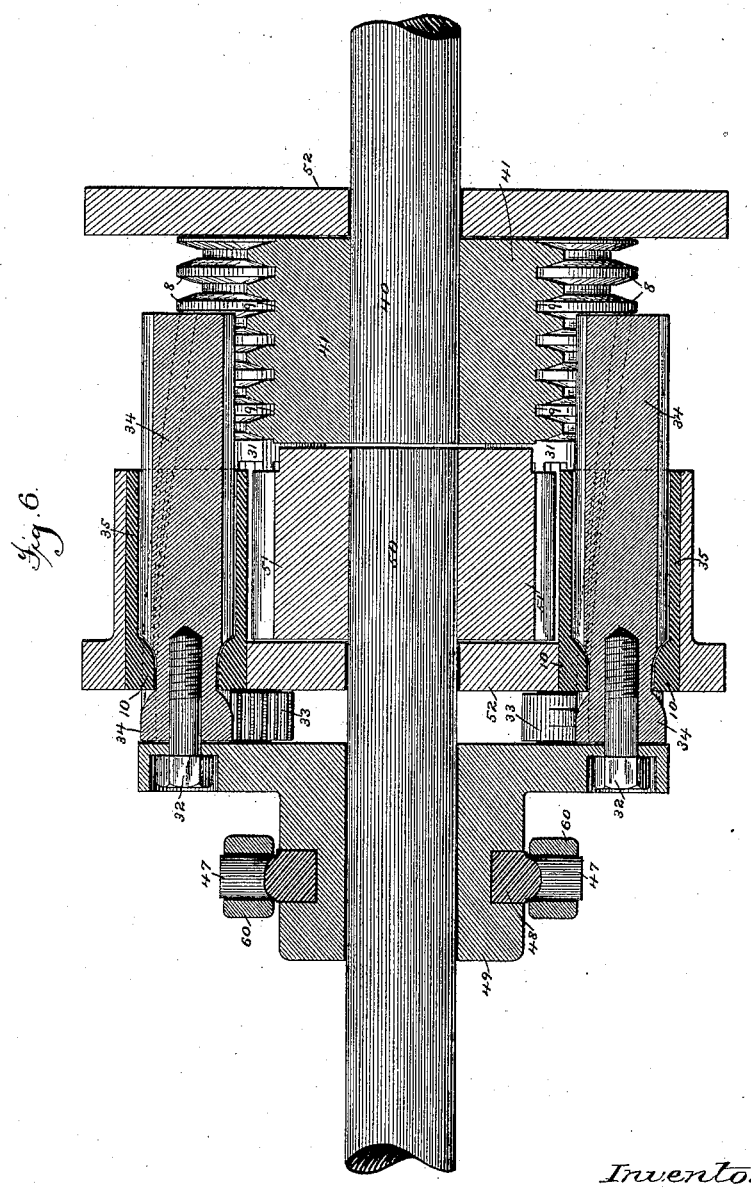

Figure 1 is a side elevation of a clutch mechanism embodying the invention. Fig. 2 is an end elevation of the same, looking from the left of Fig. 1. Fig. 3 is a cross-section taken on the line $x\,x$ of Fig. 1. Figs. 4 and 5 are similar views taken, respectively, on the lines $y\,y$ and $z\,z$ of the same figure. Fig. 6 is a longitudinal section taken on the line $x\,x$ of Figs. 2, 3, 4, and 5. Fig. 7 is a similar view taken on the line $y\,y$ of the same figures. Fig. 8 is an enlarged view of a detail, which will be hereinafter explained.

Referring to said drawings, it is to be understood that 40 50 represent the abutting ends of the two shafts which it is desired to couple, so as to transmit the motion of one to the other. One of these shafts, 50, as shown in the present case, is provided with a broad-faced pinion, 51, which is keyed fast to the end of the shaft, while the other shaft is provided at its end with a head, 41, which is keyed to the shaft and is provided with a series of circumferential V-shaped grooves, 9. The shafts 40 50 are provided just at the sides of the pinion 51 and head 41 with a pair of disks, 52, which are arranged to turn freely about the shafts, but are rigidly connected to each other by two or more tie-bars, 53. Located around the pinion 51 and head 41, with their ends entering openings in the disks 52, are a number (four, as shown in the present case) of shafts, 30, which are provided with loose sleeves 31, which extend the entire or almost the entire distance between the disks 52. The sleeves 31 are provided at one end with gear-teeth, forming pinions 20, which engage with the pinion 51, and at their other end with circumferential V-shaped ribs or projections 8, which fit into the grooves 9 of the head 41.

The journals 7 of the shafts 30 are made eccentric to the axes of the shafts, as shown in Figs. 4 and 5, so that by turning the shafts the sleeves 31 are moved to and from the pinion 51 and head 41. The ends of the shafts 30 project through and beyond one of the disks 52, and are provided with segmental gears 33, which engage with two wide pinions, 34, which are arranged to move lengthwise in sleeves 35, which are rigidly secured to the disk 52. The sleeves 35 may be integral with the disk 52, or may, as shown, be fitted into tubular bearings formed upon the disk. The sleeves 35 are provided with inwardly-projecting spirally-arranged ribs 10, which fit into correspondingly-arranged grooves 12, formed around the pinions 34. By reason of this construction it results that as the pinions 34 are moved lengthwise in the sleeves 35 they are caused to revolve slightly, thereby moving the segmental gears 33, as indicated by dotted lines in Fig. 3, and thus rocking the shafts 30 and moving the sleeves 31 inward toward the pinion 51 and head 41.

The pinions 34 are tapped at their outer ends to receive bolts 32, which pass through and turn freely in arms extending from a sleeve, 49, which fits loosely on the shaft 50. The sleeve 49 is provided with a circumferential groove, which receives a loosely-fitting ring, 48, which is made in two parts, as shown, so that it can be readily secured in position around the sleeve 49, and is provided with projecting studs 47, which are acted on by the forked end of an ordinary hand-lever, 60.

The operation of the clutch mechanism just described is as follows: In describing the operation of the apparatus it will be assumed that the shaft 40 is the driven shaft. When the shaft 50 is not clutched to the shaft 40, the pinions 34 will be moved inward, as shown in the several figures, so as to rock the segmental gears 33 and shafts 30 to such position as to hold the sleeves 31 slightly away from the head 41. When the parts are in this position, the head 41 will turn freely between the sleeves 31. Whenever it is desired to communicate the motion of the shaft 40 to the shaft 50, the lever 60 will be rocked, so as to move the sleeve 49 away from the disk 52 and draw the pinions 34 outward. As the pinions 34 are drawn outward, the ribs 10, acting in the grooves 12, will give the pinions a partial turn, and this will move the segmental gears 33, as indicated by dotted lines in Fig. 3, so as to rock the shafts 30 and cause the eccentric portions of the shafts to move the sleeves 31 inward toward the head 41 and pinion 51, as indicated by the dotted lines in Figs. 4 and 5, thus pressing the ribs 8 of the sleeves 31 into the grooves 9 of the head 41. As the ribs 8 are thus pressed into the grooves 9, the friction between the head 41 and the sleeves 31 will cause the sleeves to turn on the shafts 30, and as the pinions 20 of the sleeves engage with the pinion 51 the sleeves 31, and with them the disks 52 and the sleeve 49, will be caused to travel around the shafts 40 50 in the direction opposite to the movement of the shaft 40. As, however, the shafts 30 are gradually rocked farther and farther by the continued movement of the lever 60 and pinions 34, the sleeves 31 will be pressed inward toward the head 41 and pinion 51, and the friction between the head 41 and the sleeves will be increased by this increasing pressure until the sleeves will cease to revolve freely, and a part of the motion of the shaft 40 will be communicated to the shaft 50. By then still further increasing the pressure of the sleeves 31 against the head 41 the friction will become so great as to prevent the sleeves from revolving at all, and then the full motion of the shaft 40 will be communicated to the shaft 50. To disconnect the shaft 40 from the shaft 50, the operation will simply be reversed. The sleeve 49 will be moved toward the disk 52, thereby moving the pinions 34 and the segmental gears 33 in the reverse direction, so as to move the sleeves 31 away from the head 41 and pinion 51. It will readily be seen that the operation would be the same if the shaft 50 instead of the shaft 40 were the driven shaft. In such case, however, the sleeves 31 would be revolved on the shafts 30 when the clutch was not in operation, and this would not be so desirable.

From the foregoing it will be seen that the clutching of the shaft 50 to the shaft 40 is effected in such a way that the shaft 50 is allowed to take up the motion of the driven shaft gradually and without any sudden jar or strain. This makes the clutch mechanism herein shown especially adapted for use in those cases where it is desired to stop and start heavy machinery by connecting it with and disconnecting it from a continuously-driven shaft.

It is to be remarked that the number of the sleeves 31 may be varied. Instead of there being four of the sleeves there may be a greater or less number. The grooves 12 and ribs 10 may also, if preferred, be so arranged that the pinions 34 will be moved inward to put the clutch into operation and outward to throw it out of operation.

The disks 52 may and preferably will be provided with a casing which will inclose and protect all of the parts between the disks. Although it is preferable that the head 41 should be provided with the grooves 9 and the sleeves 31 with the ribs 8, this may not in all cases be found necessary. Where great power is not required, the grooves and ribs 9 8 may be omitted, the head 41 and the parts of the sleeves 31 which come into contact with the head being smooth.

The pinion 51 and head 41 are herein shown as fast to shafts from one to the other of which motion is to be communicated; but it is to be understood that if the motion is to be communicated directly from a gear or pulley to another gear or pulley, or from a shaft to a gear or pulley, or vice versa, the pinion and head, or one of them, as the case may be, will be made fast to the gear or gears or pulley or pulleys.

What I claim is—

1. The combination, with the pinion 51 and head 41, fast upon the parts to and from which motion is to be communicated, of a disk, 52, carried by one of said parts and free to turn thereon, a pinion, 20, carried by said disk and turning freely in engagement with the pinion 51, and having an extension to engage frictionally with the head 41, substantially as described.

2. The combination, with the pinion 51 and head 41, fast upon the parts to and from which motion is to be communicated, of the disks 52, carried by said parts and free to turn thereon, the pinions 20, carried by and supported between said disks and turning freely in engagement with the pinion 51, and having extensions to engage frictionally with the head 41, substantially as described.

3. The combination, with the pinion 51 and head 41, fast upon the parts from and to which motion is to be communicated, of the eccentric shafts 30, mounted in the loose disks 52, and the sleeves 31, having the pinions 20, and having extensions which engage frictionally with the head 41, substantially as described.

4. The combination, with the pinion 51 and head 41, having the circumferential grooves 9, said pinion and head being fast upon the parts from and to which motion is communicated, of the eccentric shafts 30, mounted in the loose disks 52, and the sleeves 31, having the pinions 20, engaging with the pinion 51, and having ribbed extensions which engage frictionally with the head 41, substantially as described.

5. The combination, with the pinion 51 and head 41, fast upon the parts from and to which motion is to be communicated, of the eccentric shafts 30, mounted in the loose disks 52, and the sleeves 31, having the pinions 20, engaging with the pinion 51, and extensions which engage frictionally with the head 41, the gears 33 upon the shafts 30, and the pinions 34, engaging with the gears 33, substantially as described.

6. The combination, with the pinion 51 and head 41, fast upon the parts from and to which motion is to be communicated, of the disks 52, the eccentric shafts 30, carrying the sleeves 31, engaging frictionally with the head 41, and having the pinions 20, engaging with the pinion 51, the gears 33 upon the shafts 30, the pinions 34, engaging with the gears 33 and having the spiral rib and groove 10 12, and the sleeve 49, connected to said pinions 34, substantially as described.

In testimony whereof I have hereunto set my hand in the presence of two subscribing witnesses.

WILLIAM B. TURNER.

Witnesses:
J. A. HOVEY,
T. H. PALMER.